(12) United States Patent
Barney et al.

(10) Patent No.: US 6,770,584 B2
(45) Date of Patent: Aug. 3, 2004

(54) HYBRID AEROGEL RIGID CERAMIC FIBER INSULATION AND METHOD OF PRODUCING SAME

(75) Inventors: Andrea O. Barney, Bedford, MA (US); Vann Heng, Buena Park, CA (US); Kris Shigeko Oka, Huntington Beach, CA (US); Maryann Santos, Los Angeles, CA (US); Alfred A. Zinn, Huntington Beach, CA (US); Michael Droege, Livermore, CA (US)

(73) Assignee: The Boeing Company, Seattle, WA (US)

( * ) Notice: Subject to any disclaimer, the term of this patent is extended or adjusted under 35 U.S.C. 154(b) by 28 days.

(21) Appl. No.: 10/222,651

(22) Filed: Aug. 16, 2002

(65) Prior Publication Data

US 2004/0033882 A1 Feb. 19, 2004

(51) Int. Cl.$^7$ ............................ C04B 35/80; B32B 17/02
(52) U.S. Cl. ..................... 501/95.1; 501/95.2; 501/87; 428/293.4; 428/293.7; 428/478; 442/77; 442/140; 442/178; 264/640; 264/643
(58) Field of Search .............................. 501/95.1, 95.2, 501/87; 428/293.4, 293.7, 478; 264/640, 643; 442/77, 140, 178

(56) References Cited

U.S. PATENT DOCUMENTS

| | | | |
|---|---|---|---|
| 5,306,555 A | | 4/1994 | Ramamurthi et al. |
| 5,556,689 A | * | 9/1996 | Kratel et al. ................. 428/137 |
| 5,565,142 A | | 10/1996 | Deshpande et al. |
| 5,851,947 A | | 12/1998 | Hair et al. |
| 5,911,903 A | * | 6/1999 | Eyhorn et al. ................. 252/62 |
| 5,985,433 A | | 11/1999 | Leiser et al. |
| 6,080,475 A | | 6/2000 | Frank et al. |
| 6,083,619 A | | 7/2000 | Frank et al. |
| 6,090,195 A | | 7/2000 | Andersen et al. |
| 6,099,965 A | | 8/2000 | Tennent et al. |
| 6,110,439 A | | 8/2000 | Deshpande et al. |
| 2002/0061396 A1 | | 5/2002 | White |

* cited by examiner

*Primary Examiner*—Karl Group
(74) *Attorney, Agent, or Firm*—Alston & Bird LLP

(57) ABSTRACT

A hybrid insulation material comprises of porous ceramic substrate material impregnated with nanoporous material and method of making the same is the topic of this invention. The porous substrate material has bulk density ranging from 6 to 20 lb/ft$^3$ and is composed of about 60 to 80 wt % silica (SiO$_2$) 20 to 40 wt % alumina (Al$_2$O$_3$) fibers, and with about 0.1 to 1.0 wt % boron-containing constituent as the sintering agent. The nanoporous material has density ranging from 1.0 to 10 lb/ft$^3$ and is either fully or partially impregnated into the substrate to block the pores, resulting in substantial reduction in conduction via radiation and convention. The nanoporous material used to impregnate the fiber substrate is preferably formed from a precursor of alkoxysilane, alcohol, water, and an acid or base catalyst for silica aerogels, and from a precursor of aluminum alkoxide, alcohol, water, and an acid or base catalyst for alumina aerogels.

46 Claims, 4 Drawing Sheets

← In-Plane Direction →

← In-Plane Direction →

HYBRID AEROGEL RIGID CERAMIC FIBER INSULATION AND METHOD OF PRODUCING SAME

FEDERALLY SPONSORED RESEARCH OR DEVELOPMENT

This invention was made under Contract No: NAS 9-200000, WBS 1.7.8.8 awarded by NASA. The government has certain rights in this invention.

FIELD OF THE INVENTION

The invention relates to a hybrid insulation material composed of aerogel and rigid ceramic fiber materials and methods for their production, including ceramic fiber insulating materials impregnated with aerogel and other nanoporous materials. More specifically, the invention relates to low-conductivity ceramic fiber insulating materials for use on reusable launch vehicles.

BACKGROUND OF THE INVENTION

Reusable launch vehicles (RLVs), such as the space shuttle, repeatedly travel into or beyond the Earth's upper atmosphere and then return to the Earth's surface. During flight, the RLVs experience extreme temperatures, ranging from −250° F. while in orbit to over 3000° F. upon reentry to the atmosphere. Because of the extreme temperatures, the vehicle and its contents must be protected by a thermal protection system. The thermal protection system is an outer covering of insulation, the purpose of which is to prevent the body of the vehicle from reaching a certain maximum temperature. For the space shuttle, the maximum temperature is about 450° F., the temperature at which the aluminum structure of the shuttle begins to weaken.

Thermal protection systems for RLVs are constructed from a large number, usually several thousand, of insulative rigid tiles and blankets. The tiles, which are used mostly on the lower surface due to its smoother surface, function to insulate the vehicle from the environment and to radiate and reflect heat from the vehicle. In addition to protecting the vehicle from environmental heat sources, the insulative tiles also provide protection from localized heating from such sources such as the vehicle's main engine, rocket boosters and directional thrusters.

RLVs such as the space shuttle typically utilize a variety of tiles to cover the lower surface of the vehicle. Different areas of the vehicle encounter different heat profiles and different physical stresses during flight. Therefore, a variety of tiles having different compositions, densities, and coatings are placed at different positions of the vehicle depending on if such positions are leeward or windward, upper or lower surfaces, etc. The most predominate tiles used today on lower surface are Lockheed Insulation (LI) and Alumina Enhanced Thermal Barrier (AETB) are used on the base heat shield due to its relatively higher thermal conductivity.

The Lockheed Insulation materials are comprised of high purity amorphous silica fiber. To produce the Lockheed Insulation, a slurry of the silica fibers having a diameter of 1 to 3 $\mu$m is formed in deionized water with a V-blender. The slurry is mixed with ammonia and stabilized colloidal silica solution after which it is placed in a casting tower where it is dewatered and slightly pressed to remove a portion of the water. The partially dried slurry is heated to a temperature of 250° F. to remove the remaining residual water. The dried silica composition is then fired to a temperature of up to 2300° F., which causes the colloidal silica to sinter the silica fibers to one another. The resulting insulative material is a low density mass of randomly arranged fused silica fibers. By selectively pressing the silica fiber slurry and subjecting to different firing temperatures, various densities of the resulting dry silica material may be produced. The Lockheed Insulation tiles are marketed under the trade names LI-900™, LI-1500™ and LI-2200™, having densities of 9 lb/ft$^3$, 15 lb/ft$^3$ and 22 lb/ft$^3$, respectively.

The Alumina Enhanced Thermal Barrier (AETB) consists of about 68 percent silica fiber, about 12 percent Nextel fiber (a combination of alumina, silica, and borate), about 20 percent alumina fiber, and about 2 percent silicon carbide. The fiber diameter ranges from 1 to 3 $\mu$m for silica and alumina fibers, and from 5 to 10 micron for Nextel fibers. The processing is very similar to the Lockheed Insulation. Colloidal silica is not added to the AETB material before firing. Instead, high temperatures experienced during firing cause the borate within the Nextel fiber to form boron oxide, which fuses to the fibers and sinters the ceramic fibers to one another. The AETB material is commonly marketed in the forms of AETB-8™, AETB-12™, AETB-16™, and AETB-20™ tiles, having densities of 8 lb/ft$^3$, 12 lb/ft$^3$, 16 lb/ft$^3$ and 20 lb/ft$^3$ respectively.

Because of its extraordinary low thermal conductivity, LI-900™ insulation tiles are used on the lower surface of most RLVS. The pure silica fiber skeleton of LI-900™ tiles is capable of remaining in tact up to temperatures of 2500° F., which exceeds the maximum temperature (2300° F.) experienced by RLVs during reentry into the Earth's atmosphere. LI-900™ insulation, however, suffers from two main disadvantages. First, it suffers from severe shrinkage after exposure to temperatures above 2500° F. and for long periods of time. Shrinkage along the mold line of the RLV leads to widening gaps between the insulating tiles as well as surface recession and thus increases heating at the inner mold line. Second, LI-900™ and other Lockheed Insulations are not compatible with the tough coating, TUFI (toughened unipiece fibrous insulation) which is needed for improved surface durability. Application of TUFI coating results in slumping of the pure silica insulation. Because of incompatibility with the tough coating, LI-900™ materials are easily susceptible to damages during flight or servicing of the RLV.

Unlike LI-900™ insulation, the AETB material is compatible with the TUFI coating. As a result, the AETB is a much more durable tile which requires less frequent replacement. AETB, however, is more thermally conductive than the Lockheed Insulation materials. As a result of the increased thermal conductivity, the AETB material is unable to protect the RLV substructure from temperatures experienced during reentry. Therefore, AETB may not be used on much of the lower surface of the RLVs.

What is needed is a ceramic fiber insulative material having the same or lower thermal conductivity found in LI-900™ insulation while exhibiting the durability, strength and dimensional stability of AETB tile material.

SUMMARY OF THE INVENTION

The present invention is an insulating material for use in extreme temperatures having a variety of applications, but designed for the protection of reusable launch vehicles (RLVs). The insulating material is a unique combination of a substrate of sintered ceramic fibers which form a low density, highly porous material and an aerogel or other nanoporous material which impregnates at least a portion of the porous ceramic substrate. The resulting insulation has very low thermal conductivity (lower than a LI900 tile). Additionally, the insulation exhibits sufficient tensile strength, good dimensional stability, and good compatibility with the TUFI coating to withstand damage typically suffered during flight and servicing of the RLV.

The basis of the invention is the combination of a porous ceramic tile substrate with a low density nanoporous material such as silica- or alumina-based aerogel. The porous tile substrate of one embodiment includes 60 to 80 wt % silica ($SiO_2$) fibers, 20 to 40 wt % alumina ($Al_2O_3$) fibers, and with 0.1 to 1.0 wt % boron-containing constituent as the sintering powders. The silica-based or alumina-based nanoporous material typically has a density of about 1.0 lb/ft$^3$ to about 10 lb/ft$^3$.

The boron-containing constituent contained in the tile substrate provides boron-containing by-products which act to fuse and sinter the silica and alumina fibers of the substrate when heated. No supplemental binder is required during production of the insulative material A preferred embodiment of the tile substrate composition is 65 wt % to 75 wt % silica fibers, 25 wt % to 35 wt % alumina fibers, and 0.1 wt % to 0.5 wt % boron-containing constituent. A particularly preferred tile substrate composition is 67 wt % silica fibers, 32.75 wt % alumina fibers, and 0.25 wt % boron-containing powders such as boron carbide ($B_4C$).

The tile substrate material is produced by first dispersing the ceramic fibers and then a boron-containing constituent in an aqueous slurry. The slurry is blended with a shear mixer which chops and disperses the fibers evenly throughout the slurry.

Prior to formation of the insulative substrate, the fiber slurry is optionally processed through a separation means in order to remove undesirable solids, known as inclusions or shots from the fiber slurry suspension. The insulative properties of the material stems from having small diameter ceramic fibers surrounded by large volumes of air. High density ceramic shots or clumps of fiber are detrimental to the effectiveness of the insulation, and are therefore removed before casting.

After separation of inclusions, if applicable, the slurry is drained and pressed. Drainage is accomplished by transferring the slurry to a casting box where excess water from the slurry is allowed to drain from the casting box through the porous bottom of the container. Drainage of the water may be accelerated by applying a vacuum to the bottom of the casting box. The slurry is pressed to produce a wet billet of ceramic fiber. The slurry is preferably pressed vertically, by moving a top surface downwards upon the fibers, pressing them against a bottom surface.

After pressing, the wet billet is dried and fired. The drying step removes residual water from the billet. The firing step fuses the fibers to one another. Drying occurs at approximately 200° F. to 500° F. for 24 to 36 hours. Firing occurs at a temperature between about 2300° F. and about 2600° F. for 1 to 5 hours.

After firing, a tile substrate is machined to final size and then either is subjected to coating process or to a nanoporous material impregnating process. The aerogel is a nanoporous substance which resides between the fibers of the substrate and prevents the conduction or radiation of heat through the insulation in the spaces between the fibers. Thus, the nanoporosity of the aerogel utilizes the insulative capacity of the air trapped within its pores while substantially limiting the ability of air to conduct heat through the pores.

The aerogel is prepared in three steps. The first step is preparation of solution via hydrolysis of silicon alkoxide compounds for silica aerogel or aluminum alkoxides for alumina aerogel in a compatible solvent. The second step is a base or acid catalyzed gellation of the solution and impregnation of the solution into the tile substrate prior to gel formation such that the gel forms within the tile substrate. The last step is solvent removal to produce the dried aerogel within the tile substrate.

The drying step may use supercritical extraction to remove the solvent by applying pressure and temperature (depending upon the type of solvent) or other solvent exchange or evaporative drying methods. With supercritical extraction, the typical processing cycle is about 4 to 9 hours. In a preferred embodiment, a silica gel solution is formed from TMOS (tetra-methoxy silane), methanol, water, and a base catalyst. In another embodiment, the alumina gel solution is formed from aluminum tri-sec-butoxide, ethanol, water, and an acid catalyst (for example see, B. Himmel, Th. Gerber, H. Bürger, G. Holzhüter, A. Olbertz, J. Non-Cryst. Solids 186 (1995) 149–158). The sol solution is injected into the entire substrate or a portion thereof, and the impregnated substrate is placed into an autoclave for the supercritical drying step either prior to or after gellation of the silica or alumina solution in the tile substrate. Typically, during the drying step, the temperature and pressure are raised to about 625° F. and about 2000 psi over about a 1–3 hour period. After thermal equilibrium is reached and about a 1 to 8 hour decompression period, the dried aerogel is set within the substrate, forming the invented insulative material.

Alumina aerogels, which can withstand higher temperatures than the silica aerogels, may be impregnated throughout the thickness of the substrate. Its higher temperature stability allows it to be able to withstand the coating firing temperature of RCG/TUFI without slumping or cracking. Thus, the aerogel impregnation can takes place before the coating process. For high temperature application above 2000° F., the silica aerogel, on the other hand, is preferable to impregnate only about halfway from the inner mold line portion of the material. Partial thickness treatment prevents the silica aerogel from encountering the most extreme temperature conditions (>2000° F. and upward), under which it could slump and shrink within the insulation material. To minimize shrinkage, the tile substrate is first coated with the RCG/TUFI combination prior to impregnating with the silica aerogel.

The production of tile/aerogel insulation typically follows the following sequence. For alumina aerogel impregnated tile, for example, the porous tile is first cast and fired to yield billets having a density of approximately 6.0 to 20 lb/ft$^3$. Final tile configuration is then machined from the billet. The tile is machined so that the inner surface and the outer surface of the tile are roughly parallel to the in-plane direction of the aligned fibers. This arrangement provides the lowest thermal conductivity between the outer and inner mold lines. The final machined tile is then fully impregnated with alumina aerogel. Then it is subjected to RCG/TUFI spraying and firing processes. After firing, the tile product has bulk density ranging from 8 to 25 lb/ft$^3$.

The insulative material has shown very low thermal conductivity, particularly in the through-the-thickness direction. The primary reason is due to the impregnated nanoporous material occupying small pores between the fiber-to-fiber, effectively blocking convective and radiative heat transfer.

BRIEF DESCRIPTION OF THE DRAWINGS

Figure 1:
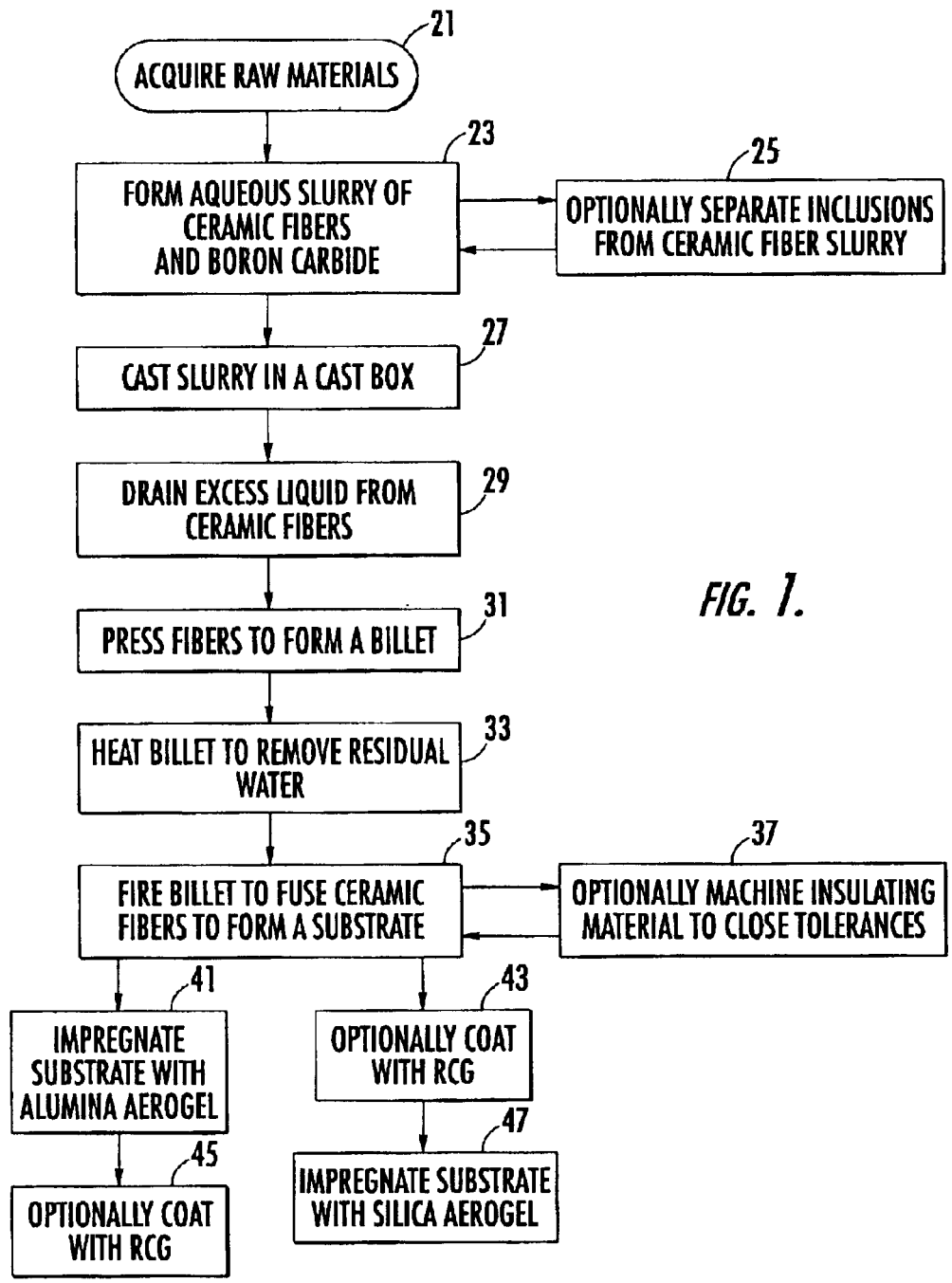
Figure 2:
Figure 3:
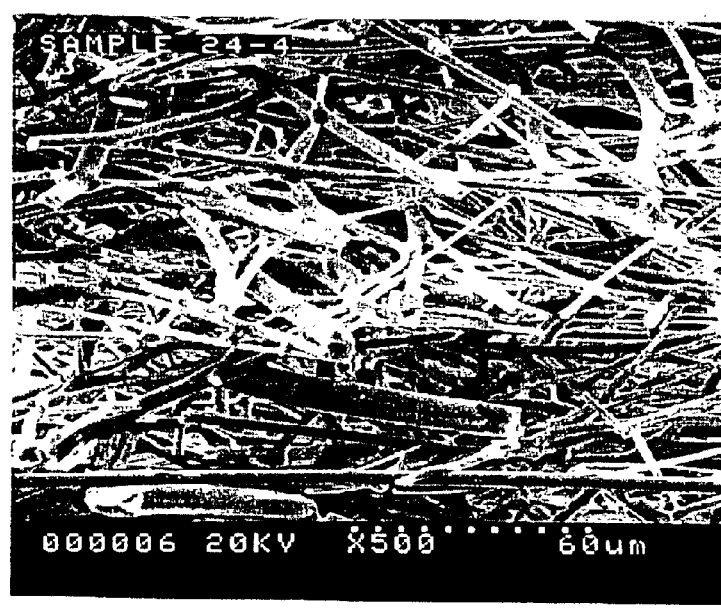
Figure 4:
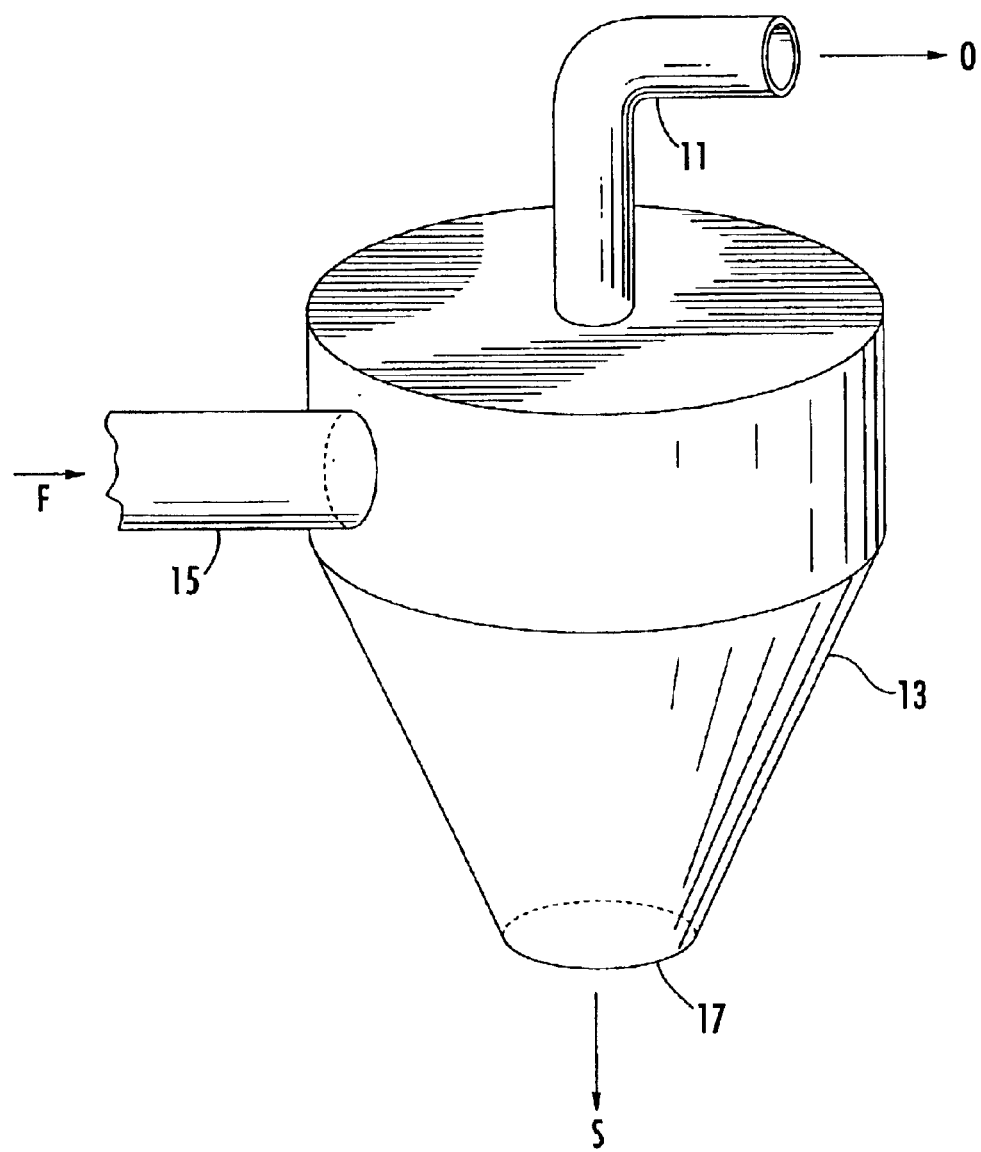
Figure 5:
Figure 6:
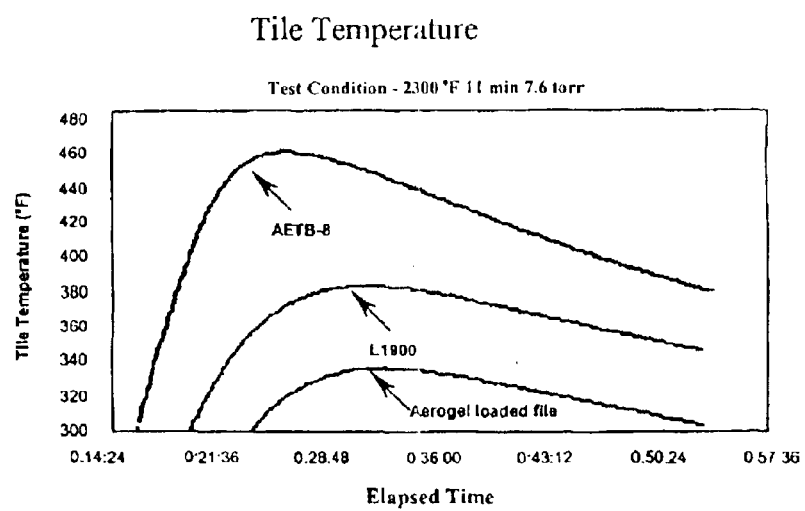

Having thus described the invention in general terms, reference will now be made to the accompanying drawings, which are not necessarily drawn to scale, and wherein:

FIG. 1 is a schematic representation of a method of producing an embodiment of the invented material;

FIG. 2 is an enlarged micrograph of ceramic fibers randomly arranged in insulating materials of the prior art;

FIG. 3 is an enlarged micrograph of the oriented fibers of an embodiment of the invented ceramic fiber substrate without aerogel material;

FIG. 4 is a drawing of a liquid cyclone for use with one embodiment of the invention;

FIG. 5 is an enlarged micrograph of the oriented fibers of an embodiment of the invented impregnated insulating material; and FIG. 6 is a graph showing backface temperature response of one embodiment of the invented material relative to prior art.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The basis of the insulating material is the combination of a substrate of fused silica ($SiO_2$) and alumina ($Al_2O_3$) fibers, with boron-containing constituents used as the sintering agent and with impregnated nanoporous materials such a silica or alumina based aerogel material. The ceramic substrate material is composed of about 60 wt % to about 80 wt % silica fibers, about 20 wt % to about 40 wt % alumina fibers, and about 0.1 wt % to about 1.0 wt % boron-containing constituent. The predominance of the insulative capability is provided by the impregnated nanoporous material. The large content of alumina fibers, about 20 wt % to about 40 wt %, provides dimensional stability and higher temperature capability to the tile substrate. Because of the large percentage of alumina, the material is able to resist slumping and shrinkage at elevated temperatures (up to 2800° F.). Because the alumina content is similar to that of AETB, the material has strength and resistance to shrinkage similar or superior to the AETB tile material.

The ability to effectively sinter both silica and alumina fibers is by the use of about 0.1 wt % to about 1.0 wt % and, more preferably, about 0.1 wt % to about 0.5 wt % boron-containing powders, such as boron carbide powders, within the substrate. During processing and firing of the material, the boron carbide releases boron-containing by-products which aid in fusing the silica and alumina fibers to one another. Thus, the fibers of the substrate are fused and sintered without the requirement of supplemental binders, such as the colloidal silica required for processing of LI-900™ insulation or Nextel fibers required for processing of AETB-8 tile material.

As noted, the boron-containing constituent provides boron oxide which acts to fuse and sinter the silica and alumina fibers when heated. Nextel™ fibers (aluminaborosilicate) used in AETB insulation also serve the function of providing boron by-products which sinter fibers to one another. However, it has been found that similar sintering properties may be obtained through the use of boron-containing powder with a much lower percentage than the Nextel required for preparation of the AETB insulation. AETB insulation requires approximately 12 wt % of Nextel™ fiber, compared to the relatively small percentage of about 0.1 wt % to about 0.5 wt % boron-containing powder generally used in the substrate of the invention.

Use of the boron-containing powders has two main advantages over the boron-containing fiber such as aluminaborosilicate fibers known as Nextel™ fiber. First, the comparatively small amount of the boron-containing powder is required to properly sinter the fibers of the substrate, and thus allows a larger percentage of both silica fiber and alumina fiber to be used within the material. Second, boron-containing fibers, such as Nextel™ fibers are typically more expensive to produce than either silica fibers or alumina fibers. Reduction in the overall amount of boron-containing fiber within the insulation dramatically reduces the overall material cost. Boron carbide powders are readily available and cost approximately an order of magnitude lower than the Nextel fibers.

A preferred embodiment of the invention combines ceramic fibers of about 65 wt % to about 75 wt % silica fibers, about 25 wt % to about 35 wt % alumina fibers, and about 0.1 wt % to about 0.5 wt % boron-containing constituent. By way of example but not of limitation, one embodiment includes 67 wt % silica fibers, 32.75 wt % alumina fibers and 0.25 wt % boron-containing constituent, such as boron carbide powders.

The diameter of the fibers affects the conductivity of the fiber substrate. A substrate with fibers having a diameter below a minimum value will lack the strength to physically support the insulation during high temperature exposure. High temperature exposure may therefore result in slumping or shrinkage of the material. Conversely, a substrate with fibers having a diameter above a maximum value will have thermal conductivity properties that are relatively high due to the increased size of the thermally conductive solid ceramic fibers. Acceptable thermal conductivity is provided by fiber diameters between about 0.5 $\mu$m and about 5.0 $\mu$m. Preferred fiber diameter is about 3.0 $\mu$m.

The porous substrate material minimizes the amount of thermal energy conducted by the solid ceramic fibers, but allows thermal energy to be conducted and radiated through the 90% or greater amount of empty volume between the ceramic fibers which make up the substrate. To inhibit the conduction through convection or radiation, the empty spaces within the substrate are impregnated with a nanoporous material such as an aerogel.

Aerogels are low density, high porosity substances having extremely small pore diameters. The aerogels encompassed by this invention have porosities greater than 60% and densities from about 1.0 lbs/ft$^3$ to about 10 lbs/ft$^3$. Because the pore diameters of the aerogels are close to or less than the mean free path of air molecules, the aerogels prevent the conduction of heat via air through the insulative material.

Referring to FIG. 1, after acquiring the raw materials, step 21, the method of producing the invented insulating material begins by first dispersing, step 23, the variety of ceramic fibers and then a boron containing material in an aqueous slurry. The slurry provides a medium in which the fibers may be easily blended with one another. Further, the slurry provides an easy means with which to transport the fibers. Typical ratio of fiber mixture to water is about 60–80 g per every gallon of water. When the fiber mixture is higher than 80 g, the fiber slurry viscosity is too high to form uniform fiber mixing and fiber dispersion, while when the fiber mixture is less than 60 g, the fibers settle to the bottom of the casting box easily, causing non-uniform density within a billet.

The slurry is blended with a shear mixer which disperses the fibers evenly throughout the slurry. It is noted that LI-900™ and AETB materials are produced using a V-blender in which the fibers are chopped and mixed via stainless steel blades spinning in vertical orientation, designed to disperse fibers evenly among one another as well as orienting each fiber in a random orientation with respect to the other fibers. The chopped fibers have an average length between about 200 micron and about 500 micron. Slurry made from a shear mixer is mixed and chopped using a high shear disk causing high radial flow rates within the slurry while maintaining relatively low axial flow rates. The result is a slurry in which the fibers are well dispersed among one another, but in which the fibers tend to be oriented lengthwise in the direction of the radial flow of the slurry during mixing, and also in which the fibers tend to be physically oriented in the same direction. The fused ceramic substrate that results from the fiber slurry retains this fiber orientation. Referring to FIG. 2, an enlarged micrograph of an insulative tile material which is fabricated from a v-blender process, reveals that the fibers within the tile are arranged in an almost random pattern with respect to one another. FIG. 3 shows an enlarged micrograph of an insulative tile produced with the fibers which have been blended with a shear mixer procedure according to one embodiment of the present invention. As can be observed, the fibers still have an almost random dispersion pattern, but tend to be individually oriented along a common plane, referred to hereinafter as the "in-plane" direction. The orientation of the fibers in the in-plane direction imparts several favorable qualities to the insulative material which will be discussed in the disclosure below. The commonly oriented fibers are described herein as "substantially ordered". By "substantially ordered", it is meant that, on average, the lengthwise direction of the fibers will be closer to parallel than perpendicular to the in-plane direction of the material.

In one embodiment of the invention, the fiber slurry is classified, step 25, through a separation means in order to remove undesirable solids, known as inclusions or fiber shots from the fiber slurry suspension. Ceramic fibers are produced by drawing extremely thin fibers from a large body of ceramic. During production, two main problems occur. First, relatively large ceramic beads, known as shots, may be pulled into the ceramic fiber material. Second, the ceramic material may form clumps due to localized high temperatures experienced during production of the ceramic fiber. In either case, the shots or clumps are undesirable in the production of the insulative substrate because the large volume of solid represented by the shots and clumps tends to conduct heat more readily than the thin ceramic fibers.

To solve the problem associated with shots and clumps, the fiber slurry of the invention is circulated through a classifier, a device which separates large solids from solid-liquid suspensions. The slurry may be classified by any of a large number of separation means. Separation means are any means known in the art of separating large solid particles from a solid-liquid suspension. Such separation means may include, but are not limited to, cone classifiers, liquid cyclones, drag classifiers, rake and spiral classifiers, bowl desilters, hydroseparators, solid-bowl centrifuges, and counter-current classifiers. Due to its low cost of operation, the liquid cyclone is the preferred means of separating large solids from the slurry.

Referring to FIG. 4, a liquid cyclone has an upper pipe 11 which extends downward into a conical shell 13. A feed pipe 15 introduces feed slurry "F" into the conical shell 13 at a rate and pressure such that only a portion of the liquid-solid mixture "S", known as sands, is allowed to escape through a bottom opening in the shell portion 13. The remaining slurry is projected upwards through the upper pipe 11. The slurry feed enters the conical portion of the cyclone at a tangent to the outer periphery of the cone, so the slurry is projected around and around the cyclone apparatus. Due to centrifugal force, the heavier particles of the slurry, i.e. the shot and clumps, tend to be forced against the walls of the cone 13 and move down to the bottom outlet 17 of the cone. The remaining liquid and lightweight unclumped fibers are removed through the upper pipe 11 as overflow "O". After separation, the amount of water in the slurry is adjusted, if necessary, and preparation of the substrate is continued. After separation of inclusions, if applicable, the slurry is transferred, step 27, to a casting box. A casting box may take any of a variety of configurations, but is preferably a container having sidewalls of a particular configuration and having a porous bottom wall. Since the shape of the wet billet formed in the casting box will approximate the shape of the final insulating tile produced by this method, it is more convenient to utilize a casting box which has a shape approximating the shape of the desired finished tile. Typically, the shape of the box has a square cross-section.

Excess water from the slurry is allowed to drain, step 29, from the casting box through the porous bottom of the container. Drainage of the water may be accelerated by applying a vacuum to the bottom of the casting box. A vacuum of 0.01 MPa to 0.04 MPa is sufficient to remove the bulk of water residing among the otherwise porous amount of ceramic fiber.

After bulk water is removed from the slurry, the slurry is pressed, step 31, by moving the top lid of the casting box toward the bottom wall of the casting box, compacting the ceramic fibers and forcing a portion of the remaining water from the box. The wet billet of ceramic fiber is pressed within the box to a certain height to reach the desired density and is maintained under compressed load for approximately 4 to 5 minutes to remove excess water as much as possible. The compressed height of the wet billet can be varied to tailor the final billet density. It has been found that allowing the fibers to rest along the bottom of the casting box while pressing the slurry and fibers from above help promote the fibers to align in the in-plane direction. The in-plane arrangement of the ceramic fibers provides a finished insulation material which exhibits favorable strength and thermal conductivity in through-the-thickness orientation.

After pressing, the wet billet is removed from the casting box and placed into a conventional oven, where it is preheated, step 33, between 200° F. to 500° F. to remove residual water from the billet. A typical drying process, depending on the size and density of the wet billet, requires at least 24 hours to 36 hours at 200 to 500° F. to completely remove excess water. One way to determine if a green billet is ready for firing is to check its dried weight. If the dried weight is equal to 90% of the total fiber amount used in the slurry, the billet is ready for firing. The remaining 10% of fibers are usually captured within the hydrocyclone and along the transferring piping. After drying, the porous fiber billet is substantially free of water. A dried billet should not be exposed to ambient air for more than 1 hour as it tends to absorb moisture and the residual moisture could lead to cracking during firing.

After heating, the billet is fired, step 35, at a temperature of between about 2300° F. and about 2600° F. for a period of between 1 and 5 hours depending on the billet density. Slow heating rate is required to minimize cracking. The initial heating rate is 20° F./min from room temperature to 2000° F., and 3° F./min from 2000° F. to the maximum soak temperatures. During the firing of the ceramic fibers, the boron-containing constituents partially decompose, forming borates within the fibrous material. The borate compounds agglomerate at the junctions of the alumina and silica fibers and act to fuse the fibers. Thus fused, the ceramic material exhibits superior strength and thermal conductivity, with no need for supplemental binders. The ability to bind the fibers with only the borate compounds greatly simplifies the production of the fiber substrate by eliminating processing steps formerly required to introduce and react binders into the fibers. After firing, the substrate is cooled to room temperature.

After firing, the porous sintered ceramic fiber substrate is machined into a final size and then is impregnated with nanoporous materials such as silica, step 47, or alumina, step 41, aerogel material. The preferred method of impregnation is preparation of an aerogel solution, vacuum infiltration of the solution into the porous tile substrate, and supercritical processing to form a dried aerogel material within the spaces between the ceramic fibers. For example, for a silica aerogel, the precursor is an alkoxysilane, preferably TMOS (tetramethoxy silane, $Si(OCH_3)_4$) or TEOS (tetraethoxysilane, $Si(OCH_2CH_2)_4$ mixed with an alcohol, preferably methanol or ethanol, water, and a base catalyst such as ammonium hydroxide. The percentage of components is varied to obtain a desired density of aerogel. Typical percentages for the aerogel precursor composition are about 5 wt % to about 25 wt % alkoxysilane, about 50 wt % to about 90 wt % alcohol, about 5 wt % to about 20 wt % water, and ammonium hydroxide dissolved in the water component at a concentration of about 0.01 to 10 moles per liter of water.

For an alumina aerogel, for example, the precursor is aluminum tri-sec-butoxide, an alcohol which is preferably a mixture of ethanol and/or methanol, water, and an acid catalyst such as acetic acid. A typical mixture is composed of about 5 to 25 wt % aluminum tri-sec-butoxide, about 50 to 90 wt % alcohol, about 0.1 to 10 wt % deionized water, and about 1 to 10 wt % acetic acid. Once the precursor is prepared, the precursor solution is vacuum infiltrated into the porous ceramic substrate. The typical infiltration process is to vacuum bag the tile substrate to fully evacuate the tile and the vacuum bag, and then introduce the alumina aerogel solution until the tile is filled. Once impregnated, the tile itself appears to accelerate the aerogel gellation step and, unlike prior art techniques, using the invented technique, no additional gellation or aging time is required. Instead, once gelled the impregnated ceramic material is placed in an autoclave (supercritical reactor), the temperature and pressure are ramped up to approximately 625° F. and 2000 psi over about a 1–3 hour period and then, after thermal equilibrium is reached, the reactor is depressurized over about a 4 hour period. As used herein, a supercritical reactor is a reactor capable of maintaining a substance under supercritical conditions, i.e. at a temperature above which a gas cannot be liquified at any pressure Referring to FIG. 5, the dried aerogel material substantially occupies the voids between the ceramic fibers of the substrate and is loosely bonded to individual fibers. The aerogel material, which is nanoporous with a porosity typically between 70% and 90%, prevents the transmittance of heat through the voids in the ceramic fiber substrate, significantly lowering the thermal conductivity of the overall insulation material.

In contrast to traditional methods of aerogel preparation, we find that the tile substrate of this invention, in combination with and impregnated by the solvent-filled (wet) gel form of the aerogel, provides a unique processing environment for the super- or sub-critical drying of the aerogel phase. In particular, in our process the solvent-filled gel form of the aerogel, although completely connected through the bulk of the tile substrate, is essentially distributed into a multitude of very small compartments by virtue of being impregnated into the multitude of small pore spaces originally in the tile substrate. Each of these small compartments is much more readily processed and dried, and the entire ensemble of aerogel compartments, although collectively physically large, will process much more easily than a corresponding aerogel monolith of comparable size. As a result, the tile-aerogel composite of this invention exhibits essentially no propensity for the aerogel phase to shrink or crack during processing. Thus the resulting dried aerogel fully occupies the pore spaces within the tile substrate and provides maximum insulating benefit (see FIG. 5). In addition, this distribution of small aerogel compartments allows for a more rapid and efficient processing method than would be otherwise possible. Traditional methods of aerogel processing require very slow temperature ramp-up and depressurization to minimize the forces that invariably lead to cracking and shrinking. The tile-aerogel composite of this invention allows for very rapid heat-up and depressurization without shrinking and cracking, thus providing significant processing advantages while maintaining desired performance. The final desired density of the impregnated tile will vary with its intended use. In one embodiment, the resulting insulation has a density between about 8 $lbs/ft^3$ and about 25 $lbs/ft^3$. To obtain these densities, a porous ceramic substrate having a density of between about 6.0 $lbs/ft^3$ and about 20 $lbs/ft^3$ is impregnated with aerogel material having a dry density of about 1.0 $lbs/ft^3$ and about 10 $lbs/ft^3$. In accordance with this invention, both silica- and alumina-based aerogel are easily produced with densities as low as 1.0 $lbs/ft^3$.

The silica aerogels used in this invention are preferably more dense than the alumina aerogels, with densities as low as about 1.0 $lbs/ft^3$ for better thermal performance and, in some embodiments with densities between about 5.0 $lbs/ft^3$ and 6.0 $lbs/ft^3$. Because the silica aerogels can be more dense than the alumina aerogels, and because the silica aerogels breakdown at a lower maximum temperature than the alumina aerogels (about 1500° F. compared to about 2300° F.), an embodiment of the invention only impregnates the ceramic substrate through a portion of its thickness from the surface which will be used as the inner mold line of the RLV insulation. By only impregnating the inner portion of the substrate with the silica aerogel, the silica and alumina ceramic fibers on the outside of the insulation can be exposed up to 2000–2700° F. The aerogel then assists in buffering and reducing the thermal conduction from the intermediate layer of the tile to the inner mold line. In practice, the silica is soaked through the insulative substrate to a thickness that is predicted to experience maximum temperatures of about 1500° F. during actual use. One embodiment of the invention calls for impregnating the porous ceramic substrate with silica aerogel through approximately half the thickness of the substrate. Of course, if desired, the silica aerogels may be impregnated throughout the entire thickness of the tile provided the use temperature is equal to or less than 1500° F.

Because the alumina aerogel is capable of withstanding temperatures as high as 2700° F., tiles used on the lower surfaces of vehicles such as the Space Shuttle may be entirely impregnated with alumina aerogel. Reaction cured glass (RCG) and Toughen Unipiece Fibrous Insulation (TUFI) coatings are optionally coated, steps 43 and 45, upon the outer surface of the impregnated insulative material. Unlike LI-900™ insulation, the invented insulative material resists slumping which is usually caused by the TUFI application process. The TUFI provides a tough and durable outer layer to the insulation surface for improved surface durability, which protects the material from physical damage during flight or during servicing of the vehicle.

The process for applying RCG and TUFI can be found in U.S. Pat. No. 4,093,771 to James C. Fletcher, et al. and U.S. Pat. No. 5,079,082 to Daniel B. Lesiser, et al., respectively.

Insulation materials impregnated with silica aerogel must be coated, step 43, with the RCG/TUFI coating prior to impregnation of the material. It has been found that slumping of the aerogel material and insulative material occur if the RCG/TUFI coating is applied after impregnation. It is to be understood that when the insulation is attached to a vehicle, one surface of the insulation will form part of the inner mold line of the insulation layer and an opposing surface of the insulation will form part of the outer mold line of the insulation layer. Silica aerogel is impregnated from the inner mold line to a partial depth of the insulation. The RCG/TUFI coating will be placed on the portion of the insulation corresponding to the outer mold line and, perhaps, the side portions of the tile adjacent to the portion comprising the outer mold line.

Conversely, insulative materials impregnated with alumina aerogel can be coated with RCG/TUFI, step 45, subsequent to impregnation of the material. This method has been found much simpler due to the fact that precise depth of aerogel penetration need not be tightly controlled as with the processing of silica aerogel/tile. This simpler approach results in much less impact on overall tile manufacturing cost.

If necessary, the finished insulating material may be machined to its final desired shape. Machining of the finished tile may be accomplished by the methods previously used in fabrication of LI-900™, AETB, or other similar porous ceramic insulation tiles. However, it is important to maintain the orientation of the insulative material such that the in-plane direction of the ceramic fibers will be parallel to the inner and outer mold line planes of the RLV upon installation. Overall thermal conductivity through-the-thickness (TTT) of the tile is less than the thermal conductivity through the in-plane direction of the tile. Thus, the tile is machined such that the in-plane direction of the tile will not be positioned perpendicular to the surface of the vehicle during use.

The finished insulative material is most commonly machined into a tile and then, if not already coated, is coated with either RCG or a combination of RCG over TUFI for installation on an RLV and is, therefore, referred to as a "tile" hereinafter. Of course, the superior thermal properties of the invented tile could be utilized in any myriad of applications requiring a low density, highly insulative material such as the invented tile.

As mentioned, the ceramic fibers of the tile are randomly dispersed among one another, but are processed in such a way that the fibers are physically oriented in the in-plane direction of the tile rather than being randomly oriented as in previous tiles. Referring again to FIG. 3, it is seen that the fibers are best described as having a tendency to be arranged in the in-plane direction. This arrangement provides an increase in tensile strength in the in-plane direction which prevents the shrinkage and slumping that is problematic in previous tiles. Although the fibers tend to be arranged in-plane, the fibers are not strictly oriented or ordered, so a sufficient number of fibers remain which extend at angles or perpendicular to the in-plane direction in order to provide adequate through-the-thickness (TTT) tensile strength.

In order to take full advantage of the improved thermal conductivity in the through-the-thickness direction, the tile should be installed on the RLV such that the in-plane direction of the fibers is parallel to the plane of either the surface of the tile which makes up the outer mold line or the surface of the material which makes up the inner mold line of the insulation layer. Thus, thermal energy must pass through the tile at an angle perpendicular to the orientation of the fibers within the material. In most circumstances, the planar or near planar surfaces of the inner and outer tile surfaces will be parallel. In circumstances where the inner and outer mold lines do not form parallel planes, the in-plane direction of the fibers may be situated parallel to either the lower or upper surface plane or in between the direction of the two planes.

The impregnated insulative material exhibits very low thermal conductivity, particularly in the through-the-thickness direction. Extensive radiant heat testing of aerogel/tile specimens has demonstrated approximately backface response temperature 10 to 15% lower than LI900. FIG. 6 shows backface response temperatures from the aerogel/tile specimen compared to LI900 tile specimen.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Likewise, the following examples are intended to further illustrate certain embodiments of the invention, but are not intended to limit the breadth of the present invention.

EXAMPLES

Example 1

Preparation of Rigid Tile Substrate Prior to Aerogel Impregnation

An 8 lbs/ft$^3$ tile production billet having a finished size of 10"×10"×5.5" was fabricated according to the present invention in the manner as follows: 4 grams of boron carbide powder, 1082 grams of silica fiber, and 518 grams of alumina fiber were added in a tub containing 20 gallons of de-ionized water and 10 mL of surfactant. The conductivity of the water was measured, which must be less than 1 MOH, prior to the addition of the raw fibers, boron carbide powder, and surfactant. Mixing of the raw materials was conducted using the shear mixer for a total time of 6 minutes. The slurry was then pumped out of the tub traversing through the hydrocyclone and into the casting tower. Once the slurry has been completely transferred into the 11.5-inch by 11.5-inch casting box, the slurry was manually stirred using a stirring paddle for 2 minutes. After which, water was drained out of the casting box. Once most of the water has been drained, compression loading was applied onto the wet billet until the billet thickness reached ~5.3 to 5.5 inches. Compression load was held for 4 minutes and the billet was then removed from the casting box. Thereafter, the billet was placed in the 300° F. drying oven for at least 24 hours or when the weight reaches 90% of the total raw fibers. Once dried, the billet was set inside the furnace with its bottom side up. Ceramic setter bars and 0.5-inch thick ceramic plate was also used as part of the firing setup. Sintering of the fibers occurred at the 2450° F. for 3 hours. After removal from the furnace, the as-fired billet was trimmed to the 10-inch by 10-inch by 4.75-inch dimension. Tile specimen of specified dimension, usually a 6-inch by 6-inch by 2-inch, was then machined from the trimmed billet.

Example 2

Preparation of Silica Aerogel Precursor Solution

In a large flask, 585 mL of methanol and 180 mL of tetramethoxysilane were added and mixed until homogeneous. Next, 162 mL of a 0.01 M ammonium hydroxide solution was added to the methanol and tetramethoxysilane solution with stirring. Once homogeneous, this solution is ready for tile impregnation.

Example 3

Infiltration of the Tile Substrate with Silica Aerogel Precursor Solution

To infiltrate the tile substrate with the silica aerogel precursor solution, the tile was sealed in a vacuum bag, the bag was fully evacuated, and the silica gel solution was introduced into the bag using a large bore needle until the tile was filled. The infiltrated tile remained sealed in the bag until the silica precursor solution solidified to a gel.

Example 4

Supercritical Processing of the Tile Substrate Infiltrated with Silica Gel Solution After vacuum infiltration of a tile substrate with silica gel solution, the tile was then transferred to a container filled with methanol to prevent drying of the silica gel and the container was then placed into an autoclave that also was filled with methanol. The tile was then supercritically dried to produce the aerogel loaded tile. The supercritical reactor was raised in temperature from ambient to about 572° F. in about 2 hours. During this time the pressure increased from normal atmospheric to about 2000 psi, at which point the pressure was maintained by use an automatic pressure release valve. After the temperature reached about 572° F., the system temperature was maintained at this point for the remainder of the process. The system was allowed to equilibrate at 572° F. for two hours. At the end of the equilibration period, the system pressure was controllably reduced from 2000 psi to normal atmospheric pressure over a period of about 4 hours. After cooling, the processed tile/aerogel composite was removed from the supercritical reactor. The tile is then dried at 176–194° F. to remove any traces of solvent and water.

What is claimed is:

1. An insulative material comprising:
  a porous substrate formed of sintered ceramic fibers, wherein said ceramic fibers comprise
    about 60 wt % to about 80 wt % silica fibers;
    about 20 wt % to about 40 wt % alumina fibers; and
    about 0.1 wt % to about 1.0 wt % boron-containing constituent; and
  a nanoporous material impregnated within said porous substrate material.

2. The material of claim 1, wherein said ceramic fibers comprise
  about 65 wt % to about 75 wt % silica fibers;
  about 25 wt % to about 35 wt % alumina fibers; and
  about 0.1 wt % to about 0.5 wt % boron-containing powders.

3. The material of claim 1, wherein the material is in the form of a tile having a thickness defined by a first surface and a second surface which opposes said first surface.

4. The material of claim 3, wherein the physical arrangement of the ceramic fibers is substantially ordered and substantially parallel to the plane of at least one of said first and second surfaces of the tile.

5. The material of claim 4, wherein said first surface and said second surface are coplanar.

6. The material of claim 4, wherein the physical arrangement of the ceramic fibers is substantially parallel to the plane of said first surface of the tile.

7. The material of claim 1, wherein the ceramic fibers are chopped.

8. The material of claim 7, wherein the ceramic fibers have an average length between about 200 micron and about 500 micron.

9. The material of claim 6, wherein the ceramic fibers have an average diameter of between about 2 $\mu$m and about 5 $\mu$m.

10. The material of claim 8, wherein the ceramic fibers have an average diameter of about 3.0 $\mu$m.

11. The material of claim 1, wherein the nanoporous material is a silica based aerogel material.

12. The material of claim 11, wherein the silica aerogel material has a porosity of greater than 60%.

13. The material of claim 12, wherein the silica aerogel material has a density between about 1.0 and about 10.0 lbs/ft$^3$.

14. The material of claim 12, wherein the silica aerogel material has a density of between about 5.0 lbs/ft$^3$ and about 6.0 lbs/ft$^3$.

15. The material of claim 3, wherein the nanoporous material is a silica based aerogel material and the tile is either fully or partially impregnated with aerogel.

16. The material of claim 15, wherein the tile is impregnated with aerogel from the first surface of the tile through a portion of the thickness of the tile.

17. The material of claim 15, wherein the second surface of the tile is coated with reaction cured glass (RCG) and TUFI.

18. The material of claim 15, wherein the impregnated tile has a density of between about 8 and about 25 lbs/ft$^3$.

19. The material of claim 1, wherein the nanoporous material is a alumina based aerogel material.

20. The material of claim 19, wherein the alumina aerogel material has a porosity of greater than 60%.

21. The material of claim 19, wherein the alumina aerogel material has a density between about 1.0 and about 10 lbs/ft$^3$.

22. The material of claim 3, wherein the nanoporous material is an alumina based aerogel material and the tile is either partially or fully impregnated with aerogel.

23. The material of claim 22, wherein the second surface of the tile is coated with reaction cured glass (RCG) and TUFI.

24. The material of claim 21, wherein the impregnated tile has a density of between about 8 and about 25 lbs/ft$^3$.

25. The material of claim 1, wherein said ceramic fibers comprise about 67 wt % silica fibers;

about 32.75 wt % alumina fibers; and about 0.25 wt % boron carbide powders.

26. The material of claim 25, wherein the material is in the form of a tile having a thickness defined by a first surface and a second surface which opposes said first surface.

27. The material of claim 26, wherein the physical arrangement of the ceramic fibers is substantially ordered and substantially parallel to the plane of at least one of said first and second surfaces of the tile.

28. The material of claim 26, wherein said first surface and said second surface are coplanar.

29. The material of claim 26, wherein the physical arrangement of the ceramic fibers is substantially ordered and substantially coplanar with said first surface of the tile.

30. The material of claim 25, wherein the ceramic fibers are chopped.

31. The material of claim 30, wherein the chopped fibers have an average length between about 200 micron to about 500 micron.

32. The material of claim 30, wherein the chopped fibers have an average diameter of between about 2 $\mu$m and about 5 $\mu$m.

33. The material of claim 30, wherein the chopped fibers have an average diameter of about 3.0 $\mu$m.

34. The material of claim 25, wherein the nanoporous material is a silica based aerogel material.

35. The material of claim 34, wherein the silica aerogel material has a porosity of greater than 60%.

36. The material of claim 35, wherein the silica aerogel material has a density between about 1.0 and about 10 lbs/ft$^3$.

37. A method of producing an insulative material comprising:

forming an aqueous slurry of mixed ceramic fibers wherein said fibers comprise about 60 wt % to about 80 wt % silica fibers; about 20 wt % to about 40 wt % alumina fibers; and about 0.1 wt % to about 1.0 wt % boron-containing constituent;

removing at least a portion of the water from the slurry;

pressing the ceramic fibers into a wet billet;

removing residual water from the wet billet;

fusing the ceramic fibers to one another to form a porous substrate; and, impregnating the porous substrate with an aerogel material.

38. The method of claim 37, wherein the step of impregnating the substrate comprises impregnating the substrate with a silica based aerogel.

39. The method of claim 38, further comprising the step of forming an aerogel precursor prior to impregnating the substrate.

40. The method of claim 39, wherein forming the precursor comprises mixing an alkoxysilane, an alcohol, water, and at least one of an acid and base catalyst.

41. The method of claim 40, wherein the alkoxysilane is tetra-methoxy silane (TMOS) and wherein the alcohol is methanol.

42. The method of claim 37, wherein the step of impregnating the substrate comprises impregnating the substrate with an alumina based aerogel.

43. The method of claim 42, further comprising the step of forming an aerogel precursor prior to impregnating the substrate.

44. The method of claim 43, wherein forming the precursor comprises mixing an alumina-tri-sec-butoxide an alcohol, water, and at least one of an acid and base catalyst.

45. The method of claim 37, further comprising curing the aerogel impregnated substrate under supercritical conditions.

46. The method of claim 45, wherein the step of curing the aerogel impregnated substrate under supercritical conditions comprises gradually heating the aerogel impregnated substrate to a temperature of about 625° F. and to a pressure of about 2000 psi over about a 6–9 hour period; and gradually returning to room temperature and pressure over about a 4 hour period.

* * * * *

UNITED STATES PATENT AND TRADEMARK OFFICE
CERTIFICATE OF CORRECTION

PATENT NO. : 6,770,584 B2
DATED : August 3, 2004
INVENTOR(S) : Barney et al.

It is certified that error appears in the above-identified patent and that said Letters Patent is hereby corrected as shown below:

Column 15,
Line 24, "claim 30" should read -- claim 32 --.

Signed and Sealed this

Thirtieth Day of November, 2004

JON W. DUDAS
*Director of the United States Patent and Trademark Office*